United States Patent
Middleton

(10) Patent No.: US 11,729,007 B2
(45) Date of Patent: *Aug. 15, 2023

(54) METHODS AND APPARATUS TO MANAGE TIMING IN A BLOCKCHAIN NETWORK

(71) Applicant: Intel Corporation, Santa Clara, CA (US)

(72) Inventor: Daniel C. Middleton, Orono, MN (US)

(73) Assignee: Intel Corporation, Santa Clara, CA (US)

( * ) Notice: Subject to any disclaimer, the term of this patent is extended or adjusted under 35 U.S.C. 154(b) by 319 days.

This patent is subject to a terminal disclaimer.

(21) Appl. No.: 17/106,417

(22) Filed: Nov. 30, 2020

(65) Prior Publication Data

US 2021/0152375 A1 May 20, 2021

Related U.S. Application Data

(63) Continuation of application No. 15/926,066, filed on Mar. 20, 2018, now Pat. No. 10,880,104.

(51) Int. Cl.
*H04L 9/00* (2022.01)
*H04L 9/32* (2006.01)
(Continued)

(52) U.S. Cl.
CPC ............ *H04L 9/3297* (2013.01); *G06F 16/27* (2019.01); *G06F 21/64* (2013.01); *G06N 7/08* (2013.01);
(Continued)

(58) Field of Classification Search
None
See application file for complete search history.

(56) References Cited

U.S. PATENT DOCUMENTS

2016/0308882 A1* 10/2016 Bortnikov ............... G06F 9/466
2016/0379212 A1* 12/2016 Bowman ................ G06Q 20/06
705/71
(Continued)

FOREIGN PATENT DOCUMENTS

WO WO-2018103850 A1 * 6/2018 ............. G06F 21/64

OTHER PUBLICATIONS

European Patent Office, Extended European Search Report dated Jul. 22, 2019 in European Patent Application No. 19157038.1.
(Continued)

*Primary Examiner* — Fatoumata Traore
(74) *Attorney, Agent, or Firm* — Trop, Pruner & Hu, P.C.

(57) ABSTRACT

In a method for operating a node in a blockchain network, a node in the network automatically determines whether a new block has been committed to a blockchain in the network. In response to determining that the new block has been committed, the node automatically uses a block identifier for the new block to generate a prestochanistic timing value. Also, the node automatically uses the prestochanistic timing value to determine whether to trigger a contingent operation. For instance, the node may automatically use a function that is both prestochastic and deterministic to determine a current expiration value for the node, and the node may use the current expiration value to determine whether registration for the node should be renewed. The node may automatically send a re-registration request to the blockchain network in response to a determination that registration for the node should be renewed. Other embodiments are described and claimed.

19 Claims, 4 Drawing Sheets

(51) Int. Cl.
*H04L 9/06* (2006.01)
*G06N 7/08* (2006.01)
*G06F 16/27* (2019.01)
*G06F 21/64* (2013.01)

(52) U.S. Cl.
CPC .......... *H04L 9/0637* (2013.01); *H04L 9/3239* (2013.01); *H04L 9/50* (2022.05)

(56) References Cited

U.S. PATENT DOCUMENTS

| | | |
|---|---|---|
| 2017/0236123 A1 | 8/2017 | Ali et al. |
| 2018/0039667 A1 | 2/2018 | Pierce et al. |
| 2018/0174143 A1* | 6/2018 | Bastide .............. G06Q 20/4016 |
| 2019/0363873 A1 | 11/2019 | Fry |

OTHER PUBLICATIONS

Bauerle, "What is the Difference Between Public and Permissioned Blockchains?", Accessed Jan. 23, 2018, 3 pages, https://www.coindesk.com/information/what-is-the-difference-between-open-and-permissioned-blockchains/.

Ongaro, et al., "Raft: A Consensus Algorithm for Replicated Logs", Mar. 3, 2013, 31 pages, https://raft.github.io/slides/raftuserstudy2013.pdf.

European Patent Office, Office Action dated Oct. 5, 2021 in European Patent Application No. 19157038.1 (4 pages).

\* cited by examiner

METHODS AND APPARATUS TO MANAGE TIMING IN A BLOCKCHAIN NETWORK

This application is a continuation of U.S. patent application Ser. No. 15/926,066, filed Mar. 20, 2018, the content of which is hereby incorporated by reference.

TECHNICAL FIELD

The present disclosure pertains in general to data processing systems and in particular to methods and apparatus for managing timing in a blockchain network.

BACKGROUND

A blockchain is a distributed ledger which contain a sequence of blocks. Each block in a blockchain typically contains a set of transactions, and each block other than the first or "genesis" block includes a link or reference to the previous block in the blockchain. The data processing systems that add blocks to the blockchain by may be referred to as "nodes." The collection of nodes that cooperate to manage a distributed ledger may be referred to collectively as a "distributed ledger network" or a "distributed ledger system." When the distributed ledger is a blockchain, that collection of nodes may be referred to as a "blockchain network" or a "blockchain system." A blockchain network may operate as a peer-to-peer network.

The timing used by nodes to perform operations pertaining to a blockchain may be referred to in general as "blockchain timing." To enable all participating nodes to stay in agreement on the state of the blockchain, the blockchain system may require the nodes to use deterministic behaviors to manage the blockchain. While generally required, determinism can also lead to unwanted conditions.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Figure 1:
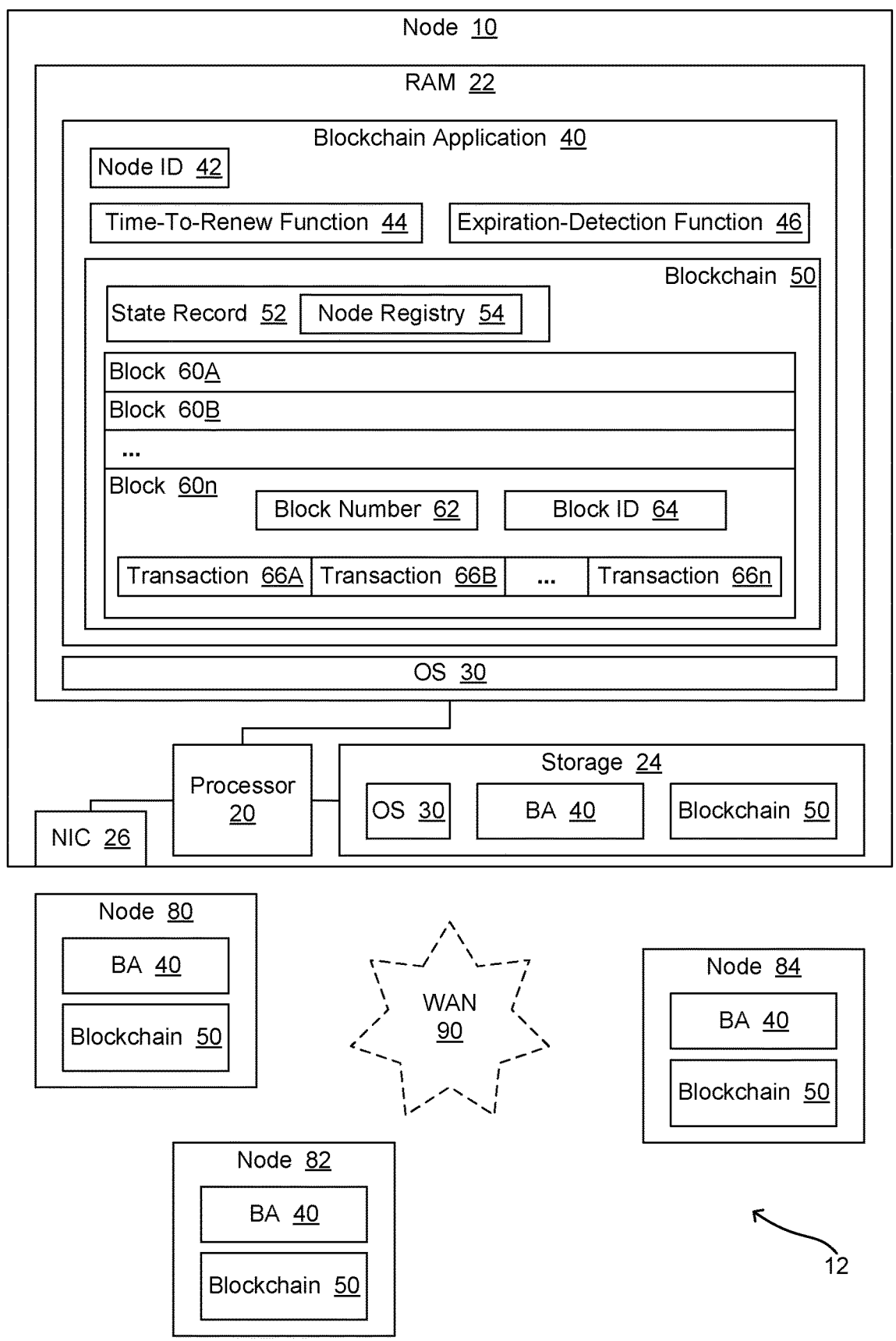
FIG. 1 is a block diagram of an example embodiment of a data processing environment which includes data processing systems with technology for managing blockchain timing.

As indicated above, determinism is generally required for at least some aspects of blockchain management. For instance, in a typical blockchain network, in order for each node to make an independent evaluation of the validity of a transaction and for all of the nodes to stay in agreement, the decision process that each node uses to evaluate the transaction must be deterministic. This requirement holds for agreement at the time that a transaction is submitted and also in the future, so that transaction replay can bring a new node into agreement with long running participants.

However, as indicated above, determinism can also lead to unwanted conditions, particularly with regard to timing. For example, when all nodes in a blockchain network must generate a particular event or perform a particular operation, it may not be desirable for all of the nodes to generate that event or perform that operation simultaneously. Node expiration may be one such event. When a node expires, the node may be required to re-register on the network. However, if all nodes expire simultaneously, the network may deadlock. For instance, if all of the nodes register at the same time, and if all of the nodes are set to expire at or near the same time, the blockchain network may become deadlocked when all of the nodes expire and there are no unexpired nodes left to process the registration requests.

Similarly, if software updates or the like are to be applied to the nodes in the network, it may be undesirable to update all of the nodes at the same time, due to issues with contention, network bandwidth, etc. Additional situations may also be subject to the same kinds of timing concerns.

The present disclosure introduces blockchain technology which enables nodes to manage the timing of events and operations within a blockchain network by using techniques which combine deterministic and stochastic features. Accordingly, the nodes in a blockchain network according to the present disclosure may avoid synchronous events that can cause problems such as deadlock, contention, etc. In particular, as described in greater detail below, a blockchain application according to one embodiment makes timing decisions on a stochastic basis, but without violating determinism rules. For instance, as described in greater detail below, in order to make timing decisions, a blockchain application may create or use a value that is stochastic, but that does not introduce irreproducible or nondeterministic results.

For purposes of this disclosure, a process is considered stochastic if the result of the process involves chance or probability. The result of a stochastic process may also be referred to as stochastic. For instance, when a node creates a new block for a blockchain, the node may generate a block identifier (ID) for the new block based at least in part on the payload of that block. In general, it is impractical or impossible to determine what the block ID for a new block will be before the payload for that block has been determined, at least in part because there is generally chance or probability involved with determining the payload. Moreover, as indicated below, the block ID may be generated by running the block payload through a hash algorithm which produces a result that is impossible or impractical to generate without that specific payload. Accordingly, the block ID is not predictable a priori (i.e., before the block payload has been decided). Consequently, the process of generating the block ID may be considered stochastic.

Also, for purposes of this disclosure, a process is considered deterministic if the result of the process can practically be replicated by multiple entities. In particular, a process that pertains to a blockchain in a particular state is considered deterministic if it is practical for all valid nodes to generate the same result from that particular state. For instance, once the payload for a block has been determined, the element of chance may no longer be relevant, and the block ID may be deterministic. Thus, a process may be stochastic when considered from one state or condition (e.g., when the payload for a block has not yet been determined), but deterministic when considered from a different state or condition (e.g., after the payload has been determined).

For purposes of this disclosure, if the result of a process is impractical or impossible to predict in advance, the process may be referred to as "prestochastic." For instance, a process that pertains to a blockchain in a particular state is considered prestochastic if the result of the process is impractical or impossible to predict from an earlier state of the blockchain. For instance, block IDs are prestochastic because the block ID for the most recently added block at any given state is impractical or impossible to predict from an earlier state of the blockchain.

The present disclosure pertains to processes and values that are both prestochastic and deterministic. For purposes of this disclosure, the term "prestochanistic" refers to a process or a value that is both prestochastic and deterministic, such as a block ID.

Accordingly, a blockchain application may use functions which combine stochastic techniques reminiscent of simulated annealing, but with globally deterministic inputs. The output of such functions allows nodes to obtain different timing decisions (e.g., expiration lifetimes) without breaking the overall determinism of the system. Additionally, the techniques are deterministic yet still satisfy security requirements that participants may not game their inputs to achieve unfairly advantageous registration durations or other timing results.

For instance, in one embodiment, a blockchain application causes nodes to re-register on a stochastic basis, but without violating determinism rules. In particular, the blockchain application may use a prestochanistic registration renewal process. Since that process is deterministic, if a series of transactions is replayed, a node will not be considered registered by one peer but not by another. Specifically, in one embodiment, the blockchain application creates a prestochanistic expiration value as a function over a relevant node ID and a relevant block ID, as described in greater detail below.

In one embodiment, the nodes use a blockchain application which generates different expiration lifetimes for different nodes. Moreover, the blockchain application may cause the expiration lifetime for each node to change every time a new block is committed to the blockchain. Thus, rather than using a uniform and static expiration lifetime for each of the nodes, the blockchain application uses a dynamic expiration lifetime that may differ for each node and that may change each time a new block gets committed. Furthermore, the blockchain application in each node may generate a new expiration value for that node each time a new block is committed, and the blockchain application may use the block identifier (ID) for the new block as a substantially random variable for computing the new or "current" expiration value. Since the block ID cannot be predicted in advance, it is prestochastic. Consequently, the current expiration value that the blockchain application derives from the new block is also prestochastic. And since the block ID does not change once the block has been committed, the block ID does not introduce irreproducible or nondeterministic results. In other words, the current expiration value is also deterministic. Consequently, the current expiration value is prestochanistic, as is the process for generating that value.

Furthermore, when generating the current expiration value for each node, the blockchain application may also use the node ID for that node. Consequently, different nodes generally get different current expiration values. Thus, the blockchain application dynamically generates the current expiration value for each node as a function over that node's ID and the block ID of the last block. Moreover, by including the block ID, in conjunction with modular arithmetic, the blockchain application prevents operators from obtaining longer admissions by selecting node IDs that are numerically larger. Additionally, according to the process described below, the probability of a node expiring and re-registering increases as the expiration time approaches a maximum allowable node registration lifetime. For purposes of this disclosure, a node may be referred to as expired when the latest registration for that node is older than the maximum allowable node registration lifetime.

In addition or alternatively, the blockchain application may use techniques that are both prestochastic and deterministic to manage the timing of other time-dependent events or operations, such as software updates, for example. In other words, the blockchain application may also use prestochanistic processes to manage the timing of events or operations other than node expiration. For purposes of this disclosure, an operation may be referred to as "time dependent" if the operation is supposed to be performed after a particular event has happened, after a particular state has been reached, during a certain time period, or the like. For instance, a node may be expected or required to renew its registration after a certain number of blocks have been added to a blockchain, or a node may be expected or required to apply a software update during a certain time period.

For example, in one embodiment, a blockchain network uses prestochanistic techniques to perform a rolling update or upgrade of the blockchain application in the nodes or of other software or data in the nodes. In particular, prestochanistic techniques may be used to gradually update the nodes within the blockchain network up to some mandatory point at which all of the nodes should be updated. Such techniques may be used with a backwards compatible update that allows nodes with mixed versions (e.g., nodes with the old version and nodes with the new version) to cooperate in managing the blockchain. Thus, as described in greater detail below, the nodes may use prestochanistic techniques to generate prestochanistic update-timing values. Those prestochanistic update-timing values may, in effect, organize the nodes into different update groups, to be updated at different times.

FIG. 1 is a block diagram of an example embodiment of a data processing environment 12 which includes data processing systems with technology for managing blockchain timing. Accordingly, data processing environment 12 may be referred to as blockchain network 12. In the embodiment of FIG. 1, blockchain network 12 includes multiple data processing systems which cooperate to manage a blockchain 50. Those data processing systems are illustrated as nodes 10, 80, 82, and 84. However, in other embodiments, blockchain networks may include a lesser or greater number of nodes.

Also, for ease of understanding, this disclosure focuses primarily on node 10. However, the other nodes may include the same or similar features, and all of the nodes may perform the same or similar kinds of operations. For instance, when discussing the operations performed by node 10, node 10 may be referred to with terms like the "local node" or the "present node," while other nodes may be referred to with terms like "remote node" or "source node." For example, a "local node" or a "present node" may receive a new block from a "remote node" or a "source node." However, it should be understood that each node may operate as a local node, a source node, etc., in suitable circumstances.

As shown in FIG. 1, the hardware components of node 10 include a processor 20 communicatively coupled to various other components via one or more system buses. For instance, node 10 includes random access memory (RAM) 22, nonvolatile storage 24, and a network interface controller (NIC) 26 responsive to processor 20.

Storage 24 includes various software components, such as an operating system (OS) 30 and a blockchain application (BA) 40. Processor 20 may copy software components into RAM 22 for execution. Accordingly, in FIG. 1, OS 30 and blockchain application 40 are depicted in storage 24 and in RAM 22. As described in greater detail below, blockchain application 40 includes instructions which, when executed by processor 20, enable node 10 to cooperate with the other nodes in blockchain network 12 to manage blockchain 50. As indicated above, each of the other nodes may include the same or similar features as node 10.

Accordingly, as illustrated in FIG. 1, each node includes a copy of blockchain application 40. Furthermore, blockchain application 40 may include a node ID 42 and one or more expiration functions, such as a time-to-renew function 44 and an expiration-detection function 46. The node ID uniquely identifies the node within which blockchain application 40 is executing. Thus, nodes 10, 80, 82, and 84 will each have different node IDs. In one embodiment, the node ID for a node is a public key for that node. Alternatively, the node ID for a node may be produced by hashing the public key for that node. In other embodiments, other techniques may be used to generate a unique node ID for each node. As described in greater detail below, blockchain application 40 may use the expiration functions to determine whether a node should renew its registration and whether registration for a node has expired.

In addition, each node includes a copy of blockchain 50. For instance, a node may store blockchain 50 in nonvolatile storage, and the node may copy some or all of blockchain 50 into RAM for processing. As shown in node 10, blockchain 50 may include a state record 52, a node registry 54, and a sequence of blocks 60A-60n. Each block may include header with contents such as a block number 62 and a block ID 64. Each block may also include a payload that contains a set or sequence of transactions 66A-66n. The block number indicates the height or count of the block, relative to the first block. Thus, the nth block has a block number of n. The block number may also be referred to as the block count. The block ID is a unique identifier for the block, typically based on at least some of the contents of the block. For instance, the block ID may be generated by running the block payload through a Secure Hash Algorithm (SHA) such as SHA-256. Accordingly, the block ID is deterministic in that the same payload always produces the same result, but the block ID is also stochastic, in that the block ID is not predictable a priori (i.e., before the block payload has been decided).

The nodes in blockchain network 12 may use one or more networks to communicate with each other. Those networks may include, for instance, a wide area network (WAN) 90, a local area network (LAN), a personal area network (PAN), a mesh network, or any other suitable type of network or combination of networks. In the embodiment of FIG. 1, blockchain network 12 is a permissioned blockchain network. In other words, in order to join blockchain network 12, a node must receive permission from the other nodes. Accordingly, node registry 54 in state record 52 identifies the nodes (e.g., by node ID) that have been admitted to blockchain network 12. Node registry 54 may also specify when (e.g., by block number) registration was last accepted for each node. As indicated below, blockchain application 40 may use node registry 54 to enforce revocation policies, such as enforcing an expiration duration subsequent to enrollment.

In particular, as described in greater detail below, blockchain application 40 uses prestochanistic processes to avoid synchronous events that can cause problems such as deadlock, contention, etc.

Figure 2:
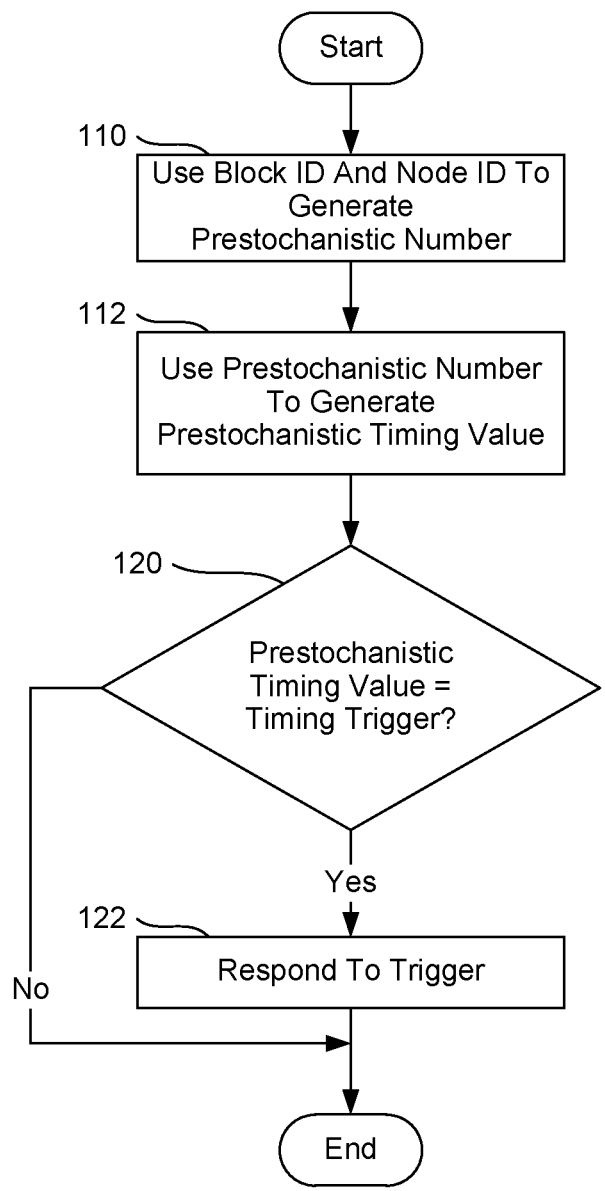
FIG. 2 presents a flowchart of an example embodiment of a process for managing blockchain timing.

FIG. 2 presents a flowchart of an example embodiment of a process for managing timing on blockchain network 12. The blockchain application in each of the nodes in block network 12 may use the operations illustrated in the process of FIG. 2 to make timing decisions. However, for purposes of illustration, the process will be described below in the context of blockchain application 40 in node 10. The process may start at block 110 with blockchain application 40 using a particular block ID and a particular node ID to generate a prestochanistic number. For instance, as described in greater detail below, blockchain application 40 may use the block ID of a new block and the node ID of node 10 or of another node.

As shown at block 112, blockchain application 40 may then use that prestochanistic number to generate a prestochanistic timing value. For instance, as described in greater detail below, blockchain application 40 may generate a prestochanistic node expiration value or a prestochanistic update-timing value. Blockchain application 40 may then use the prestochanistic timing value to determine whether a particular action should be performed. For instance, as shown at block 120, blockchain application 40 may compare the prestochanistic timing value (e.g., a current expiration value) with the timing trigger for a particular action (e.g., a node expiration limit). If the prestochanistic timing value matches or satisfies the timing trigger, blockchain application 40 may respond to the trigger accordingly (e.g., by renewing registration for node 10). However, if the prestochanistic timing value does not match or satisify the timing trigger, the process may end without further action being triggered.

Figure 3:
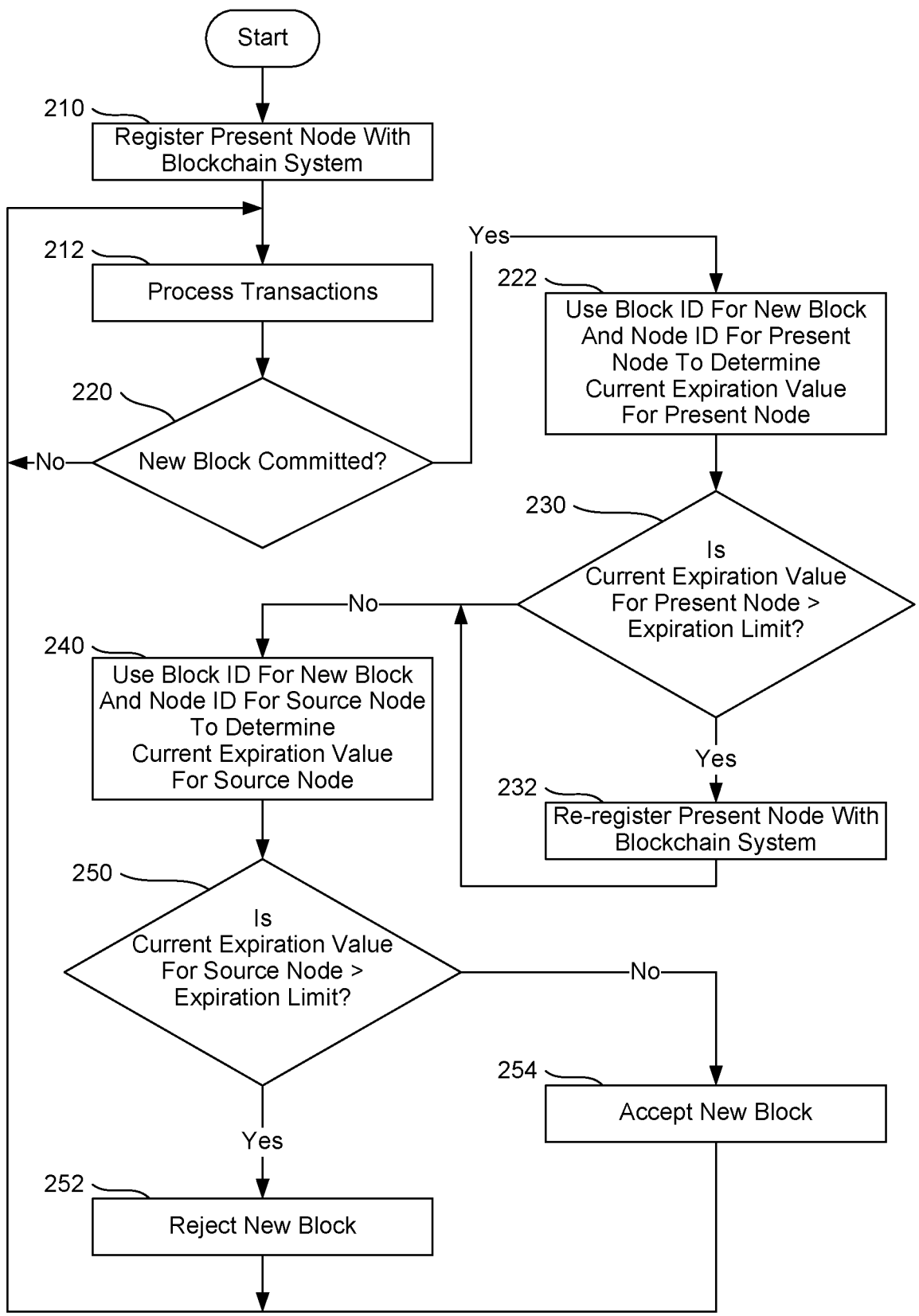
FIG. 3 presents a more detailed flowchart of an example embodiment of a process for managing blockchain timing.

FIG. 3 presents a more detailed flowchart of an example embodiment of a process for managing timing on blockchain network 12. This process is described primarily from the perspective of node 10 as the "present node." However, each of the nodes may use the same or a similar process. The process of FIG. 3 starts with the present node (e.g., node 10) registering with the other nodes (e.g., nodes 80, 82, and 84) in blockchain network 12, as shown at block 210. For instance, the present node may transmit a registration request as a transaction to the other nodes. After the present node has registered with blockchain network 12, the present node may process transactions for blockchain 50, as shown at block 212.

As shown at block 220, the present node may then determine whether a new block has been committed to blockchain 50. For instance, the present node may receive the new block from one of the other nodes, or the present node may generate and commit the new block, based on transactions processed by the present node. If a new block has not been committed, the process may return to block 212, and the present node may continue processing transactions.

However, if a new block has been committed, the present node may respond by using processes that are both deterministic and stochastic to determine (a) whether the present node should re-register due to impending registration expiration and (b) whether the new block was generated by a source node with an expired registration. In one embodiment, blockchain application 40 measures node expiration in terms of new blocks added since a node registered. Thus, each new block serves as a tick of the expiration clock. However, as indicated above, blockchain application 40 does not always use the same number of ticks as the expiration lifetime for each node. Instead, blockchain application 40 uses a dynamic expiration lifetime that may differ for each node and that may change each time a new block gets committed. In one embodiment, blockchain application 40 uses expiration functions to determine the dynamic expiration lifetimes for the relevant nodes, and blockchain application 40 uses those dynamic expiration lifetimes to determine whether the present node should renew its registration and whether registration for the source node has expired.

For instance, blockchain application 40 may call time-to-renew function 44 in response to determining at block 220 that a new block has been committed. As shown at block 222, time-to-renew function 44 may then determine a current expiration value for the present node, based on the block ID for the new block and the node ID for the present node. Accordingly, the current expiration value is prestochanistic. As indicated below, blockchain application 40 may then use that current expiration value to determine whether the present node should renew its registration.

When generating the current expiration value for the present node, time-to-renew function 44 may use a predetermined range factor and a maximum allowable node registration lifetime. For instance, in one embodiment, time-to-renew function 44 uses operations and functions like those described in the following pseudocode.

for the new block and the node ID for the present node to determine a new current expiration value for the present node.

As shown at block 230, time-to-renew function 44 may then determine whether the present node should renew its registration, based on that current expiration value, on the starting count for the present node, and on the maximum allowable registration lifetime. For purposes of this disclosure, the starting count for a node is the block number for the block that contains the latest registration transaction for that node. In other words, the starting count is the block number at the time of registration of the node. Thus, as reflected in the above pseudocode, time-to-renew function 44 may compute an expiration limit by adding the maximum allowable node registration lifetime k to the starting count for the present node. And time-to-renew function 44 may compare the current expiration value with that expiration limit to determine whether the present node should renew its registration. For example, time-to-renew function 44 may determine whether the current expiration value exceeds the expiration limit.

```
time_to_renew_function (node_id, block_id, block_number)
// The blockchain application calls this function when a network tick is received
// (i.e., when a block is committed). The function generates a new current_expiration_value
// for the given node and determines whether that current_expiration_value causes the
// given node to expire.
    block: A data structure containing a set of transactions and representing an agreement
        by the nodes on the present state of the blockchain.
    node_id: A unique identifier for the node, generally produced as a public key or hash of a
        public key value.
    starting_count: The block number at the time of registration of the node.
    block_id: A unique identifier generally produced as an SHA-256 hash of the block
        payload. Note: the block_id is deterministic yet unpredictable a priori.
    block_number: The height or count of the block within the blockchain (e.g., the nth
        block).
    k: The maximum allowable node registration lifetime (i.e., the maximum number of
        blocks allowed before a node's registration expires).
    range_factor: A percentage of the maximum allowable node registration lifetime, used to
        adjust or modulate how much expiration acceleration can be generated.
    range: Upper boundary for the permissible range of acceleration values.
    expiration_acceleration: The amount of acceleration to be used for determining whether
        the given node has expired.
    previous_expiration_acceleration: The expiration_acceleration value that was previously
        used in a positive determination of expiration.
    expiration_limit: k + starting_count
    def accelerate(block_id, node_id):
        if previous_expiration_acceleration == null:
            range = int(k * range_factor)
        else:
            range = previous_expiration_acceleration
        expiration_acceleration = (block_id + node_id) mod range
        return expiration_acceleration
    main routine:
        current_expiration_value = block_number + accelerate(block_id, node_id)
        if current_expiration_value > expiration_limit:
            expire = true
            previous_expiration_acceleration = current_expiration_value
        else:
            expire = false
        return expire
end time_to_renew_function.
```

In the above pseudocode, the current expiration value is the result of "block_number+accelerate(block_id, node_id)". In other words, the current expiration value is computed by (a) using the accelerate function to generate a prestochanistic expiration-acceleration value and then (b) adding that value to the current block number. And accelerate generates the expiration-acceleration value based on the node ID and the block ID passed to time-to-renew function 44 by blockchain application 40. Thus, as shown at block 222, time-to-renew function 44 may use the block ID The following example scenario further explains the operation of time-to-renew function 44, in the context of the above pseudocode with certain values, at least some of which have been simplified for ease of understanding. In particular, the example scenario involves the following values:

The given node_id is 5687.

The starting_count for that node is 195.

The given block_id is 9182.

The given block_number is 201.
k is set to 10.
range_factor is set to 50%.
expiration_limit is computed as 195+10=205.
range is computed as 10*50%=5 (assuming previous_expiration_acceleration is null).
expiration_acceleration is computed as (9182+5687=14869) mod 5=4.
Thus, accelerate(9182, 5687) returns 4.
current_expiration_value is computed as 201+4=205.
Since 205 is not greater than 205, renew is set to False.

Referring again to block 230 of FIG. 3, if the current expiration value causes time-to-renew function to determine that the present node should renew its registration, blockchain application 40 may re-register the present node with blockchain network 12, as shown at block 232. The process may then pass to block 240. Otherwise, the process may pass from block 230 to block 240 without registration being renewed.

Blockchain application 40 may then use expiration-detection function 46 to determine whether the source node (i.e., the node which committed the new block to blockchain 50) has an expired registration. In particular, expiration-detection function 46 may dynamically generate a new current expiration value for the source node and determine whether the source node has expired, based on that current expiration value.

In one embodiment, expiration-detection function 46 is the same as or similar to time-to-renew-function 44, but the calling node (i.e., the present node) uses the node ID for the node that was the source of the new block, rather than using its own node ID. Accordingly, as, as shown at block 240, expiration-detection function 46 may use the block ID for the new block and the node ID for the source node to determine a prestochanistic current expiration value for the source node. And as shown at block 250, expiration-detection function 46 may use that value to determine whether the source node has expired.

If expiration-detection function 46 returns a value indicating that the source node has expired, the process may proceed to block 252, which illustrates blockchain application 40 rejecting the new block. But if expiration-detection function 46 indicates that the source node has not expired, the process may pass from block 250 to block 254, which illustrates blockchain application 40 accepting the new block. The process may then return to block 210, the blockchain application 40 processing transactions and new blocks as indicated above.

In other embodiments or scenarios, however, the present node may perform additional operations before finally determining whether or not to accept a new block. For instance, the present node may validate the transactions in the payload of the new block, etc.

Figure 4:
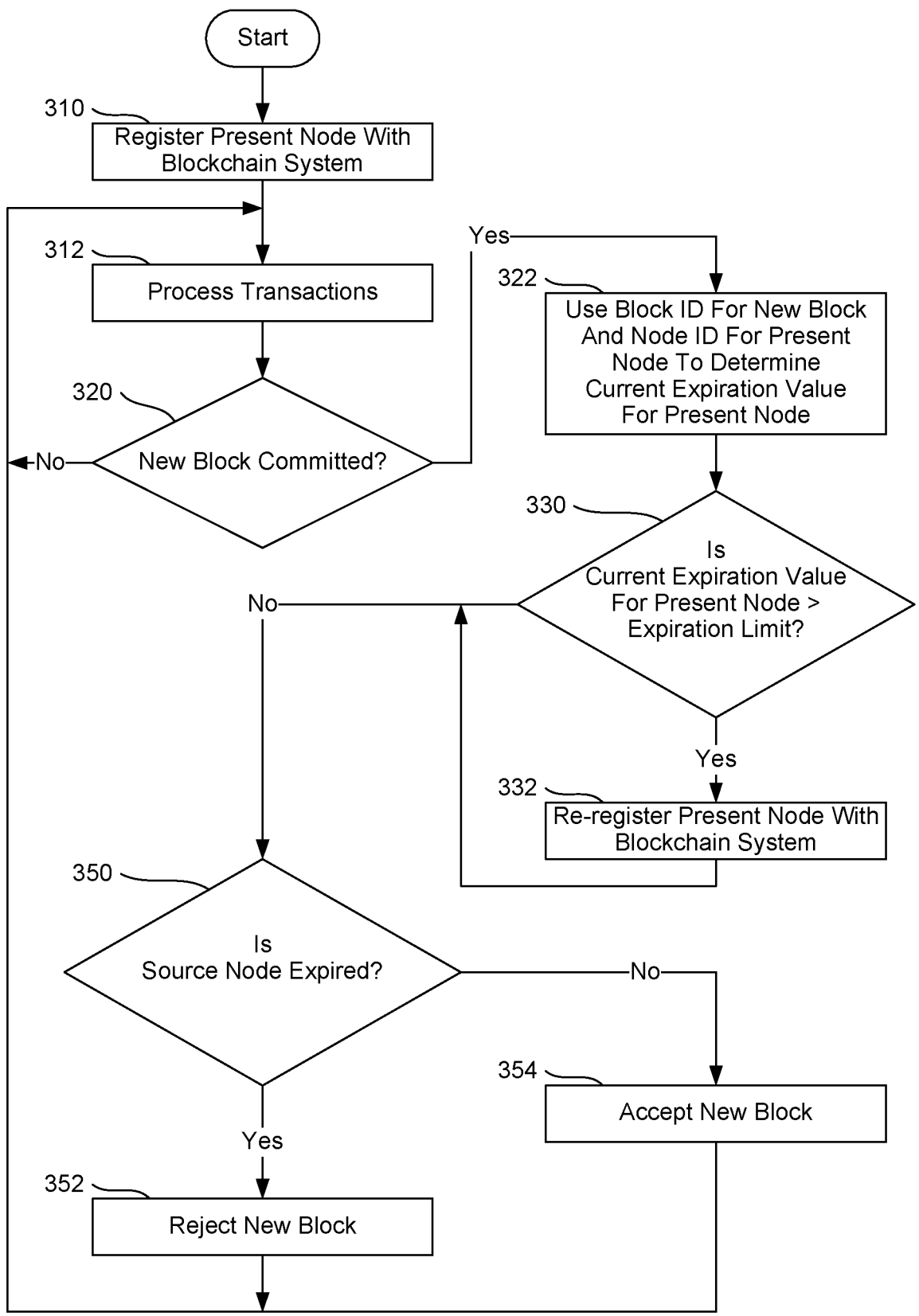
FIG. 4 presents a flowchart of an example embodiment of an alternative process for managing blockchain timing.

FIG. 4 presents a flowchart of an example embodiment of an alternative process for managing blockchain timing. For instance, the operations of FIG. 4 may be performed by an alternative embodiment of a blockchain application. The embodiments of FIG. 3 and FIG. 4 are the same or similar with regard to many operations. For instance, blocks 310, 312, 320, 322, 330, and 332 in FIG. 4 may be the same or similar to blocks 210, 210, 212, 220, 222, 230, and 232 in FIG. 3, respectively. However, in the embodiment of FIG. 4, the blockchain application may not generate a current expiration value for the source node. Instead, as shown at block 350, the blockchain application may determine whether the source node has expired simply based on the current block number, the starting count for the source node, and the expiration limit. As shown at blocks 352, the blockchain application may then reject the new block if the source node is expired. But as shown at block 354, the blockchain application may accept the new block of the source node has not expired.

For the sake of clarity, the present description discusses example embodiments which use various specific formulas, calculations, etc. However, other embodiments may use different formulas, calculations, etc. to achieve the same ends. For instance, the above pseudocode for the time_to_renew_function computes expiration_acceleration by combining block_id and node_id and then modding that result with range. Also, the pseudocode for the time_to_renew_function makes sure that expiration_acceleration is at least 1, to make sure that the node re-registers before it expires. However, other embodiments may use different formulas and values to compute expiration-acceleration values. For instance, another embodiment may use a formula of the form a^b mod n, where a is the block ID or the node ID, b is the node ID or the block ID, respectively, and n is the range. Other embodiments may use other formulas to convert at least one prestochanistic value (e.g., block ID) into a different prestochanistic value that is modulated by some limit. Similarly, in other embodiments or scenarios, an expiration function may be configured to conclude that registration has expired when the current expiration value for the given node equals or exceeds the expiration limit. Moreover, expiration functions may use other variations in the process for determining whether registration for a node has expired. For instance, when computing current expiration values, nodes may use functions that generate accelerations values (e.g., expiration_acceleration) which are strictly decreasing, relative to an initial acceleration value. However, those variations may retain the utilization of features that are prestochanistic.

In addition or alternatively, as indicated above, the nodes may use prestochanistic techniques to generate prestochanistic update-timing values. Those prestochanistic update-timing values may, in effect, organize the nodes into different update groups, to be updated at different times. For instance, in one embodiment, a node may use techniques like those described above with regard to time-to-renew function 44 to generate an acceleration value based on the node ID for that node and a block ID for the latest block, and the node may use that acceleration value as well as an update-timing trigger to determine whether the node should update its blockchain application. The update-timing trigger may be like the expiration limit discussed above. For instance, update-timing trigger may be based on a maximum allowable lifetime (e.g., a maximum allowable number of new blocks) before an update must be applied. Since this technique causes different nodes to be updated at different times, there is an opportunity to detect defects in the new version and to alter the version or halt the upgrade on the network before all of the nodes have been updated.

Thus, as has been described, a blockchain application uses at least one process that is both deterministic and prestochastic to manage blockchain timing decisions, such as whether the present node should re-register, whether a newly committed block should be accepted, and whether an update should be performed.

Although certain example embodiments are described herein, one of ordinary skill in the art will understand that those example embodiments may easily be divided, combined, or otherwise altered to implement additional embodiments. Likewise, expressions such as "an embodiment," "one embodiment," and "another embodiment" are meant to generally reference embodiment possibilities. Those expressions are not intended to limit the invention to particular embodiment configurations. As used herein, those expressions may reference the same embodiment or different embodiments, and those embodiments are combinable into other embodiments. In light of the principles and example embodiments described and illustrated herein, it will be recognized that the illustrated embodiments can be modified in arrangement and detail without departing from such principles.

As described above, a device may include instructions and other data which, when accessed by a processor, cause the device to perform particular operations. For purposes of this disclosure, instructions which cause a device to perform operations may be referred to in general as "software." Software and the like may also be referred to as "control logic." Software that is used during a boot process may be referred to as "firmware," as may software that is stored in nonvolatile memory. Software may be organized using any suitable structure or combination of structures. Accordingly, terms like "program" and "module" may be used in general to cover a broad range of software constructs, including without limitation application programs, subprograms, routines, functions, procedures, drivers, libraries, data structures, processes, microcode, and other types of software components. Also, it should be understood that a software module may include more than one component, and those components may cooperate to complete the operations of the module. Also, the operations which the software causes a device to perform may include creating an operating context, instantiating a particular data structure, etc. Any suitable operating environment and programming language (or combination of operating environments and programming languages) may be used to implement software components described herein.

A medium which contains data and which allows another component to obtain that data may be referred to as a "machine-accessible medium" or a "machine-readable medium." In one embodiment, software for multiple components is stored in one machine-readable medium. In other embodiments, two or more machine-readable media may be used to store the software for one or more components. For instance, instructions for one component may be stored in one medium, and instructions another component may be stored in another medium. Or a portion of the instructions for one component may be stored in one medium, and the rest of the instructions for that component (as well instructions for other components), may be stored in one or more other media. Similarly, software that is described above as residing on a particular device in one embodiment may, in other embodiments, reside on one or more other devices. For instance, in a distributed environment, some software may be stored locally, and some may be stored remotely. Similarly, operations that are described above as being performed on one particular device in one embodiment may, in other embodiments, be performed by one or more other devices.

Accordingly, alternative embodiments include machine-readable media containing instructions for performing the operations described herein. Such media may be referred to in general as apparatus and in particular as program products. Such media may include, without limitation, tangible non-transitory storage components such as magnetic disks, optical disks, RAM, read-only memory (ROM), etc., as well as processors, controllers, and other components that include data storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. In some embodiments, some or all of the control logic for implementing the described operations may be implemented in hardware logic (e.g., as part of an integrated circuit chip, a programmable gate array (PGA), an application-specific integrated circuit (ASIC), etc.).

The present teachings may be used to advantage in many different kinds of data processing systems. Example data processing systems may include, without limitation, accelerators, systems on a chip (SOCs), wearable devices, handheld devices, smartphones, telephones, entertainment devices such as audio devices, video devices, audio/video devices (e.g., televisions and set-top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. A data processing system may also be referred to as an apparatus. The components of a data processing system may also be referred to as apparatus.

Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Also, for purpose of this disclosure, the term "processor" denotes a hardware component that is capable of executing software. For instance, a processor may be implemented as a central processing unit (CPU), a processing core, or as any other suitable type of processing element. A CPU may include one or more processing cores, and a device may include one or more CPUs.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a data processing system with technology to enable the data processing system to operate as a node in a permissioned blockchain network. The data processing system comprises a processor, a machine-readable medium responsive to the processor, and instructions stored in the machine-readable medium. The instructions, when executed by the data processing system, enable the data processing system to: (a) after the data processing system has been registered as a node in a permissioned blockchain network that manages a blockchain, automatically determine whether a new block has been committed to the blockchain; (b) in response to determining, at the node, that the new block has been committed, automatically use a function that is both stochastic and deterministic to determine whether registration for the node has expired; and (c) in response to determining that registration for the node has expired, automatically send a re-registration request for the node to the permissioned blockchain network.

Example A2 is a data processing system according to Example A1, wherein the node comprises a present node. Also, the instructions, when executed by the present node, further enable the present node to: (a) in response to determining that the new block has been committed by a source node, automatically use a function that is both stochastic and deterministic to determine whether registration for the source node has expired; and (b) automatically reject the new block in response to determining that registration for the source node has expired.

Example A3 is a data processing system according to Example A2, wherein the operation of using a function that is both stochastic and deterministic to determine whether registration for the present node has expired comprises using a node identifier for the present node and a block identifier for the new block to determine whether registration for the present node has expired. Also, the operation of using a function that is both stochastic and deterministic to determine whether registration for the source node has expired comprises using a node identifier for the source node and the block identifier for the new block to determine whether registration for the source node has expired.

Example A4 is a data processing system according to Example A1, wherein the operation of using a function that is both stochastic and deterministic to determine whether registration for the node has expired comprises using a node identifier for the node and a block identifier for the new block to determine whether registration for the node has expired. Example A4 may also include the features of one or more of Examples A2 through A3.

Example A5 is a data processing system according to Example A4, wherein the operation of using a node identifier for the node and a block identifier for the new block to determine whether registration for the node has expired comprises (a) using the node identifier for the node and the block identifier for the new block to generate a current expiration value for the node, and (b) using the current expiration value for the node and a block number for the new block to determine whether registration for the node has expired.

Example A6 is a data processing system according to Example A4, wherein the operation of using a node identifier for the node and a block identifier for the new block to determine whether registration for the node has expired comprises (a) using the node identifier for the node, the block identifier for the new block, a predetermined range factor, and a maximum allowable node registration lifetime to generate a current expiration value for the node; and (b) using the current expiration value for the node and a block number for the new block to determine whether registration for the node has expired. Example A6 may also include the features of Example A5.

Example A7 is a data processing system according to Example A4, wherein the operation of using the current expiration value for the node and a block number for the new block to determine whether registration for the node has expired comprises (a) using the block number for the new block to determine a current registration lifetime for the node, and (b) using the current registration lifetime for the node and the current expiration value for the node to determine whether registration for the node has expired. Example A7 may also include the features of one or more of Examples A5 through A6.

Example B1 is an apparatus to enable a data processing system to operate as a node in a permissioned blockchain network. The apparatus comprises a non-transitory machine-readable medium and instruction stored in the machine-readable medium. The instructions, when executed by a data processing system, enable the data processing system to (a) after the data processing system has been registered as a node in a permissioned blockchain network that manages a blockchain, automatically determine whether a new block has been committed to the blockchain; (b) in response to determining, at the node, that the new block has been committed, automatically use a function that is both stochastic and deterministic to determine whether registration for the node has expired; and (c) in response to determining that registration for the node has expired, automatically send a re-registration request for the node to the permissioned blockchain network.

Example B2 is an apparatus according to Example B1, wherein the node comprises a present node, and the instructions, when executed by the present node, further enable the present node to (a) in response to determining that the new block has been committed by a source node, automatically use a function that is both stochastic and deterministic to determine whether registration for the source node has expired; and (b) automatically reject the new block in response to determining that registration for the source node has expired.

Example B3 is an apparatus according to Example B2, wherein the operation of using a function that is both stochastic and deterministic to determine whether registration for the present node has expired comprises using a node identifier for the present node and a block identifier for the new block to determine whether registration for the present node has expired. Also, the operation of using a function that is both stochastic and deterministic to determine whether registration for the source node has expired comprises using a node identifier for the source node and the block identifier for the new block to determine whether registration for the source node has expired.

Example B4 is an apparatus according to Example B1, wherein the operation of using a function that is both stochastic and deterministic to determine whether registration for the node has expired comprises using a node identifier for the node and a block identifier for the new block to determine whether registration for the node has expired. Example B4 may also include the features of any one or more of Examples B2 through B3.

Example B5 is an apparatus according to Example B4, wherein the operation of using a node identifier for the node and a block identifier for the new block to determine whether registration for the node has expired comprises (a) using the node identifier for the node and the block identifier for the new block to generate a current expiration value for the node, and (b) using the current expiration value for the node and a block number for the new block to determine whether registration for the node has expired.

Example B6 is an apparatus according to Example B4, wherein the operation of using a node identifier for the node and a block identifier for the new block to determine whether registration for the node has expired comprises (a) using the node identifier for the node, the block identifier for the new block, a predetermined range factor, and a maximum allowable node registration lifetime to generate a current expiration value for the node; and (b) using the current expiration value for the node and a block number for the new block to determine whether registration for the node has expired. Example B6 may also include the features of Example B5.

Example B7 is an apparatus according to Example B4, wherein the operation of using the current expiration value for the node and a block number for the new block to determine whether registration for the node has expired comprises (a) using the block number for the new block to determine a current registration lifetime for the node, and (b) using the current registration lifetime for the node and the current expiration value for the node to determine whether registration for the node has expired. Example B7 may also include the features of any one or more of Examples B5 through B6.

Example C1 is an apparatus to enable a data processing system to operate as a node in a permissioned blockchain network. The apparatus comprises a non-transitory machine-readable medium and instruction stored in the machine-readable medium. The instructions, when executed by a data processing system, enable the data processing system to (a) after the data processing system has been registered as a present node in a permissioned blockchain network that manages a blockchain, automatically determine whether a new block has been committed to the blockchain by a source node; (b) in response to determining that the new block has been committed by the source node, automatically use a function that is both stochastic and deterministic to determine whether registration for the source node has expired; and (c) automatically reject the new block in response to determining that registration for the source node has expired.

Example C2 is an apparatus according to Example C1, wherein the operation of using a function that is both stochastic and deterministic to determine whether registration for the source node has expired comprises using a node identifier for the source node and the block identifier for the new block to determine whether registration for the source node has expired.

Example D1 is a method for operating a node in a permissioned blockchain network. The method comprises (a) at a node that is registered in a blockchain that is managed by a permissioned blockchain network, automatically determining whether a new block has been committed to the blockchain; (b) in response to determining, at the node, that the new block has been committed, automatically using a function that is both stochastic and deterministic to determine whether registration for the node has expired; and (c) in response to determining that registration for the node has expired, automatically sending a re-registration request for the node to the permissioned blockchain network.

Example D2 is a method according to Example D1, wherein the operation of using a function that is both stochastic and deterministic to determine whether registration for the node has expired comprises using a node identifier for the node and a block identifier for the new block to determine whether registration for the node has expired.

Example D3 is a method according to Example D2, wherein the operation of using a node identifier for the node and a block identifier for the new block to determine whether registration for the node has expired comprises (a) using the node identifier for the node and the block identifier for the new block to generate a current expiration value for the node; and (b) using the current expiration value for the node and a block number for the new block to determine whether registration for the node has expired.

Example D4 is a method according to Example D2, wherein the operation of using a node identifier for the node and a block identifier for the new block to determine whether registration for the node has expired comprises (a) using the node identifier for the node, the block identifier for the new block, a predetermined range factor, and a maximum allowable node registration lifetime to generate a current expiration value for the node; and (b) using the current expiration value for the node and a block number for the new block to determine whether registration for the node has expired. Example D4 may also include the features of any one or more of Examples D2 through D3.

Example D5 is a method according to Example D4, wherein the operation of using the current expiration value for the node and a block number for the new block to determine whether registration for the node has expired comprises (a) using the block number for the new block to determine a current registration lifetime for the node; and (b) using the current registration lifetime for the node and the current expiration value for the node to determine whether registration for the node has expired.

What is claimed is:

1. An apparatus to enable a data processing system to operate as a node in a blockchain network, the apparatus comprising:
    a non-transitory machine-readable medium; and
    instructions stored in the machine-readable medium, wherein the instructions, when executed by a data processing system, implement at least part of a blockchain application which enables the data processing system to perform operations comprising:
        automatically determining whether a new block has been committed to a blockchain in a blockchain network for which the data processing system is a node;
        in response to determining that the new block has been committed, automatically using a block identifier for the new block to generate a prestochanistic timing value; and
        automatically using the prestochanistic timing value to determine whether to trigger a contingent operation;
    wherein the operation of automatically using the block identifier for the new block to generate the prestochanistic timing value comprises automatically using a function that is both prestochastic and deterministic to determine a current expiration value for the node;
wherein the operation of using the function that is both prestochastic and deterministic to determine the current expiration value for the node comprises using a node identifier for the node and the block identifier for the new block to determine the current expiration value for the node; and
wherein the operation of automatically using the prestochanistic timing value to determine whether to trigger the contingent operation comprises using the current expiration value for the node to determine whether registration for the node should be renewed.

2. An apparatus according to claim 1, wherein the operations further comprise:
automatically sending a re-registration request for the node to the blockchain network, in response to a determination that registration for the node should be renewed.

3. An apparatus according to claim 1, wherein the operation of using the current expiration value for the node to determine whether registration for the node should be renewed comprises:
using the current expiration value for the node and a block number for the new block to determine whether registration for the node should be renewed.

4. An apparatus according to claim 3, wherein:
the operation of using the node identifier for the node and the block identifier for the new block to determine the current expiration value for the node comprises using the node identifier for the node, the block identifier for the new block, and a predetermined range factor to generate the current expiration value for the node; and
the operation of using the current expiration value for the node and the block number for the new block to determine whether registration for the node should be renewed comprises using a maximum allowable node registration lifetime, the current expiration value for the node, and the block number for the new block to determine whether registration for the node should be renewed.

5. An apparatus according to claim 1, wherein:
the instructions enable the data processing system to serve as a present node; and the operations further comprise:
in response to determining that the new block has been committed by a source node, automatically using a function that is both prestochastic and deterministic to determine whether registration for the source node has expired; and
automatically rejecting the new block in response to determining that registration for the source node has expired.

6. An apparatus according to claim 5, wherein the operation of using the function that is both prestochastic and deterministic to determine whether registration for the source node has expired comprises:
using a node identifier for the source node and the block identifier for the new block to determine a current expiration value for the source node; and
using the current expiration value for the source node to determine whether registration for the source node has expired.

7. An apparatus according to claim 1, wherein:
the operation of automatically using the block identifier for the new block to generate the prestochanistic timing value comprises automatically using a function that is both prestochastic and deterministic to determine a prestochanistic update-timing value for the node;
the operation of automatically using the prestochanistic timing value to determine whether to trigger a contingent operation comprises using the prestochanistic update-timing value for the node to determine whether the node should update the blockchain application in the node; and
the operations further comprise automatically updating the blockchain application in the node, in response to a determination that the node should update the blockchain application.

8. An apparatus to enable a data processing system to operate as a present node in a blockchain network, the apparatus comprising:
a non-transitory machine-readable medium; and
instructions stored in the machine-readable medium, wherein the instructions, when executed by a data processing system, implement at least part of a block chain application which enables the data processing system to perform operations comprising:
automatically determining whether a new block has been committed to a blockchain in a blockchain network for which the data processing system is a present node;
in response to determining that the new block has been committed, automatically using a block identifier for the new block to generate a prestochanistic timing value;
automatically using the prestochanistic timing value to determine whether to trigger a contingent operation;
in response to determining that the new block has been committed by a source node, automatically using a function that is both prestochastic and deterministic to determine whether registration for the source node has expired; and
automatically rejecting the new block in response to determining that registration for the source node has expired;
wherein the operation of using the function that is both prestochastic and deterministic to determine whether registration for the source node has expired comprises:
using a node identifier for the source node and the block identifier for the new block to determine a current expiration value for the source node; and
using the current expiration value for the source node to determine whether registration for the source node has expired.

9. An apparatus according to claim 8, wherein:
the operation of automatically using the block identifier for the new block to generate the prestochanistic timing value comprises automatically using a function that is both prestochastic and deterministic to determine a prestochanistic update-timing value for the present node;
the operation of automatically using the prestochanistic timing value to determine whether to trigger a contingent operation comprises using the prestochanistic update-timing value for the present node to determine whether the present node should update the blockchain application in the present node; and
the operations further comprise automatically updating the blockchain application in the present node, in response to a determination that the present node should update the blockchain application.

10. An apparatus according to claim 8, wherein:
the operation of automatically using the block identifier for the new block to generate the prestochanistic timing value comprises automatically using a function that is both prestochastic and deterministic to determine a current expiration value for the present node; and
the operation of automatically using the prestochanistic timing value to determine whether to trigger the contingent operation comprises using the current expiration value for the present node to determine whether registration for the present node should be renewed.

11. An apparatus according to claim 10, wherein the operations further comprise:
automatically sending a re-registration request for the present node to the blockchain network, in response to a determination that registration for the present node should be renewed.

12. An apparatus according to claim 10, wherein:
the operation of using the function that is both prestochastic and deterministic to determine the current expiration value for the present node comprises using a node identifier for the present node and the block identifier for the new block to determine the current expiration value for the present node; and
the operation of using the current expiration value for the present node to determine whether registration for the present node should be renewed comprises using the current expiration value for the present node and a block number for the new block to determine whether registration for the present node should be renewed.

13. An apparatus according to claim 12, wherein:
the operation of using the node identifier for the present node and the block identifier for the new block to determine the current expiration value for the present node comprises using the node identifier for the present node, the block identifier for the new block, and a predetermined range factor to generate the current expiration value for the present node; and
the operation of using the current expiration value for the present node and the block number for the new block to determine whether registration for the present node should be renewed comprises using a maximum allowable node registration lifetime, the current expiration value for the present node, and the block number for the new block to determine whether registration for the present node should be renewed.

14. An apparatus to enable a data processing system to operate as a node in a blockchain network, the apparatus comprising:
a non-transitory machine-readable medium; and
instructions stored in the machine-readable medium, wherein the instructions, when executed by a data processing system, implement at least part of a blockchain application which enables the data processing system to perform operations comprising:
automatically determining whether a new block has been committed to a blockchain in a blockchain network for which the data processing system is a node;
in response to determining that the new block has been committed, automatically using a block identifier for the new block to generate a prestochanistic timing value; and
automatically using the prestochanistic timing value to determine whether to trigger a contingent operation;
wherein the operation of automatically using the block identifier for the new block to generate the prestochanistic timing value comprises automatically using a function that is both prestochastic and deterministic to determine a prestochanistic update-timing value for the node;
wherein the operation of automatically using the prestochanistic timing value to determine whether to trigger a contingent operation comprises using the prestochanistic update-timing value for the node to determine whether the node should update the blockchain application in the node; and
wherein the operations further comprise automatically updating the blockchain application in the node, in response to a determination that the node should update the blockchain application.

15. An apparatus according to claim 14, wherein:
the instructions enable the data processing system to serve as a present node; and
the operations further comprise:
in response to determining that the new block has been committed by a source node, automatically using a function that is both prestochastic and deterministic to determine that registration for the source node has expired; and
automatically rejecting the new block in response to determining that registration for the source node has expired.

16. An apparatus according to claim 15, wherein the operation of using the function that is both prestochastic and deterministic to determine whether registration for the source node has expired comprises:
using a node identifier for the source node and the block identifier for the new block to determine a current expiration value for the source node; and
using the current expiration value for the source node to determine whether registration for the source node has expired.

17. An apparatus according to claim 14, wherein:
the operation of automatically using the block identifier for the new block to generate the prestochanistic timing value comprises automatically using a function that is both prestochastic and deterministic to determine a current expiration value for the node; and
the operation of automatically using the prestochanistic timing value to determine whether to trigger the contingent operation comprises using the current expiration value for the node to determine whether registration for the node should be renewed.

18. An apparatus according to claim 17, wherein the operations further comprise:
automatically sending a re-registration request for the node to the blockchain network, in response to a determination that registration for the node should be renewed.

19. An apparatus according to claim 17, wherein:
the operation of using the function that is both prestochastic and deterministic to determine the current expiration value for the node comprises using a node identifier for the node and the block identifier for the new block to determine the current expiration value for the node; and
the operation of using the current expiration value for the node to determine whether registration for the node should be renewed comprises using the current expiration value for the node and a block number for the new block to determine whether registration for the node should be renewed.

* * * * *